United States Patent
Miyashita

(10) Patent No.: US 8,042,983 B2
(45) Date of Patent: Oct. 25, 2011

(54) LIGHT GUIDE PLATE FOR DISPLAY DEVICE

(75) Inventor: Junji Miyashita, Fujiyoshida (JP)

(73) Assignee: Citizen Electronics Co., Ltd., Yamanashi (JP)

( * ) Notice: Subject to any disclaimer, the term of this patent is extended or adjusted under 35 U.S.C. 154(b) by 572 days.

(21) Appl. No.: 11/720,308

(22) PCT Filed: Nov. 24, 2005

(86) PCT No.: PCT/JP2005/021549
§ 371 (c)(1),
(2), (4) Date: Sep. 22, 2008

(87) PCT Pub. No.: WO2006/057282
PCT Pub. Date: Jun. 1, 2006

(65) Prior Publication Data
US 2009/0109683 A1  Apr. 30, 2009

(30) Foreign Application Priority Data
Nov. 25, 2004  (JP) .................. 2004-341314

(51) Int. Cl.
*F21V 7/04* (2006.01)
(52) U.S. Cl. ............... 362/615; 362/620; 362/626
(58) Field of Classification Search .......... 362/626, 362/615–625, 627–629; 349/62
See application file for complete search history.

(56) References Cited

U.S. PATENT DOCUMENTS

| 6,582,095 | B1 | 6/2003 | Toyoda | |
| 6,731,355 | B2 * | 5/2004 | Miyashita | 349/65 |
| 2003/0058633 | A1 * | 3/2003 | Suzuki | 362/31 |

FOREIGN PATENT DOCUMENTS

| JP | 6250025 A | 9/1994 |
| JP | 200135222 A | 2/2001 |
| JP | 2004327096 A1 | 11/2004 |

* cited by examiner

*Primary Examiner* — Robert May
(74) *Attorney, Agent, or Firm* — Browdy and Neimark, PLLC

(57) ABSTRACT

A light guide plate according to the present invention includes an incident plane into which a light flux from a light source is incident, and a plurality of prisms having reflection planes reflecting the light flux incident from the incident plane, wherein the reflection planes of the plurality of prisms are extended to cross in a direction in which the light flux from the light source incident into the incident plane travels, and of the reflection planes of the plurality of prisms, the reflection plane of at least one prism closest to the incident plane is formed in a recess shape with respect to the incident plane. Thereby nonuniformity of backlight illumination can be improved and a display device can be uniformly and efficiently illuminated.

3 Claims, 9 Drawing Sheets section B-B section C-C

LIGHT GUIDE PLATE FOR DISPLAY DEVICE

TECHNICAL FIELD

The present invention relates to a light guide plate in a backlight system used for illuminating, for example, a liquid crystal display. More specifically, the present invention relates to a light guide plate which can guide uniform illuminating light to a liquid crystal display regardless of change in incident angle of a light flux emitted from a light source.

BACKGROUND ART

FIG. 9 shows an example of a conventional art backlight system illuminating a display device (not shown) (see Patent Reference 1). The backlight system has a light source 5 including one or a plurality of light emitting diodes (hereinafter, abbreviated as LED or LEDs) and a light guide plate 1 having an incident plane 3 receiving light emitted from the light source 5. A reflection sheet 7 is arranged facing a first plane 2 of the light guide plate 1. A diffusion sheet 8 is arranged facing a second plane 4 of the light guide plate 1. Two prism sheets 9 and 10 are arranged above the diffusion sheet. The second plane 4 is a plane facing the display device. The reference numeral 6 denotes the state of progression of a few of the light beams in the light guide plate 1.

As shown in FIG. 10, in the conventional art backlight system having the above-described structure, when viewed from the second plane 4, in other words, the display device, the illuminating light illuminating the display device is nonuniform. As shown in FIG. 10, in more detail, in the plane of the light guide plate 1 (the diffusion sheet 8, and the prism sheets 9 and 10 are removed), a hatched portion 20 is a region appearing bright viewed from the front (the upper side) and an unhatched brightness shortage portion 21 is caused in the portion near the incident plane 3. The backlight user identifies that the brightness of the illuminated plane is nonuniform and there is illumination nonuniformity. To reduce the illumination nonuniformity, the number of light sources 5 is increased so as to bring the adjacent light sources 5 closer to each other in order to reduce the proportion of the light beam 6 incident into the incident plane 3 at a large angle.

The reason why illumination nonuniformity is caused will be described based on the structure of the conventional art light guide plate shown in FIGS. 11A to 11C and FIG. 12. To efficiently emit an incident light flux from the second plane 4 (the lower side viewed in FIG. 11C), the conventional art light guide plate 1 has a plurality of prisms provided on the first plane 2. As shown in FIGS. 11A and 11C, the respective prisms are linearly extended over the overall width of the light guide plate 1 in parallel with the incident plane 3. As shown in FIG. 12, each of the prisms is a prism with a triangle cross section shape having a reflection plane 2a gently and downwardly tilted from the front position near the light incident plane 3 toward the rear position far from the incident plane 3, a back plane 2b steeply tilted from the rear position rearward of the light guide plate 1, and a ridge line 2c formed by the reflection plane 2a and the back plane 2b. The reflection plane 2a is formed at a tilt angle (mold tilt angle) α0 with respect to the second plane 4 of the light guide plate 1.

When the respective prisms are formed in parallel with the incident plane 3 of the light guide plate 1, as shown in FIG. 11A, a tilt angle (a substantial tilt angle α) on the reflection plane 2a with respect to horizontal light incident horizontally from the incident plane 3 is different depending on an incident angle θ of the light beam 6 (one light beam included in the light flux incident into the light guide plate 1) formed on the plane of the light guide plate 1. This will be described with reference to FIG. 13. When the mold tilt angle α0 on the reflection plane 2a of the prism formed on the light guide plate 1 is expressed by d/p, the substantial tilt angle α on the reflection plane 2a of the light beam 6 incident from the incident plane 3 into the light guide plate 1 at the incident angle θ is expressed by d/p1. Since p<p1, the substantial tilt angle α is smaller than the mold tilt angle α0. As shown in FIG. 11A, the substantial tilt angle α on the reflection plane 2a with respect to the light beam incident substantially parallel with a center line D (which is typically substantially matched with the center axis of the light flux of the light source 5) of the light guide plate 1 orthogonal to the incident plane 3 is very close to the mold tilt angle α0 of the prism. The substantial tilt angle α on the reflection plane 2a with respect to the light beam 6 incident at the incident angle θ is approximately, α=α0·cos θ. As the light incident angle θ increases, the substantial tilt angle α gradually decreases and the amount of light reflected on the reflection plane 2a is gradually reduced, so that the amount of light emitted from the second plane 4 is reduced.

FIG. 14 is a graph (curve F) showing the substantial tilt angle α on the reflection plane 2a with respect to the incident angle θ of the light beam in the conventional art prism. The substantial tilt angle α is largest when the incident angle θ=0 (the light beam 6 is incident into the incident plane 3 of the light guide plate almost at a right angle) (in this example, α0=approximately 2°), and gradually decreases as the incident angle θ of the light beam increases.

In the conventional art light guide plate 1 shown in FIGS. 11A to 11C and FIG. 12, the amount of light reflected on the reflection plane 2a for the light beam 6 incident into the incident plane 3 at the large incident angle θ is greatly reduced, which is a major cause of illumination nonuniformity. To make considerable compensation for illumination nonuniformity, a plurality of light sources 5 (LEDs) need to be arranged close to each other so as to prevent the incident angle θ of the light beam 6 from becoming large.

Patent Reference 1: Japanese Patent Application Laid-Open No. 2004-327096 (FIG. 17)

DISCLOSURE OF THE INVENTION

Problem to be Solved by the Invention

An object of the present invention is to provide a light guide plate which can uniformly illuminate a display device without reduction in the amount of reflected light when light from a light source is incident into an incident plane at a large incident angle.

Means for Solving Problem

To achieve the above object, a light guide plate according to the present invention includes an incident plane on which a light flux emitted from a light source is incident, and a plurality of prisms having reflection planes reflecting the light flux which travels in the light guide plate. The reflection planes of the plurality of prisms are extended to cross in the direction in which the light flux travels in the light guide plate. Of the reflection planes of the plurality of prisms, the reflection plane of at least one prism closest to the incident plane is formed in a recess shape with respect to the incident plane.

Effect of the Invention

The light guide plate according to the present invention can improve nonuniformity of backlight illumination without increasing the number of components and can minimize the number of light sources. A display device such as a small electronic device using the light guide plate for backlight can be improved to be uniformly and efficiently illumination. The quality of the display device can be improved. The cost can be reduced.

BEST MODE FOR CARRYING OUT THE INVENTION

Figure 1:
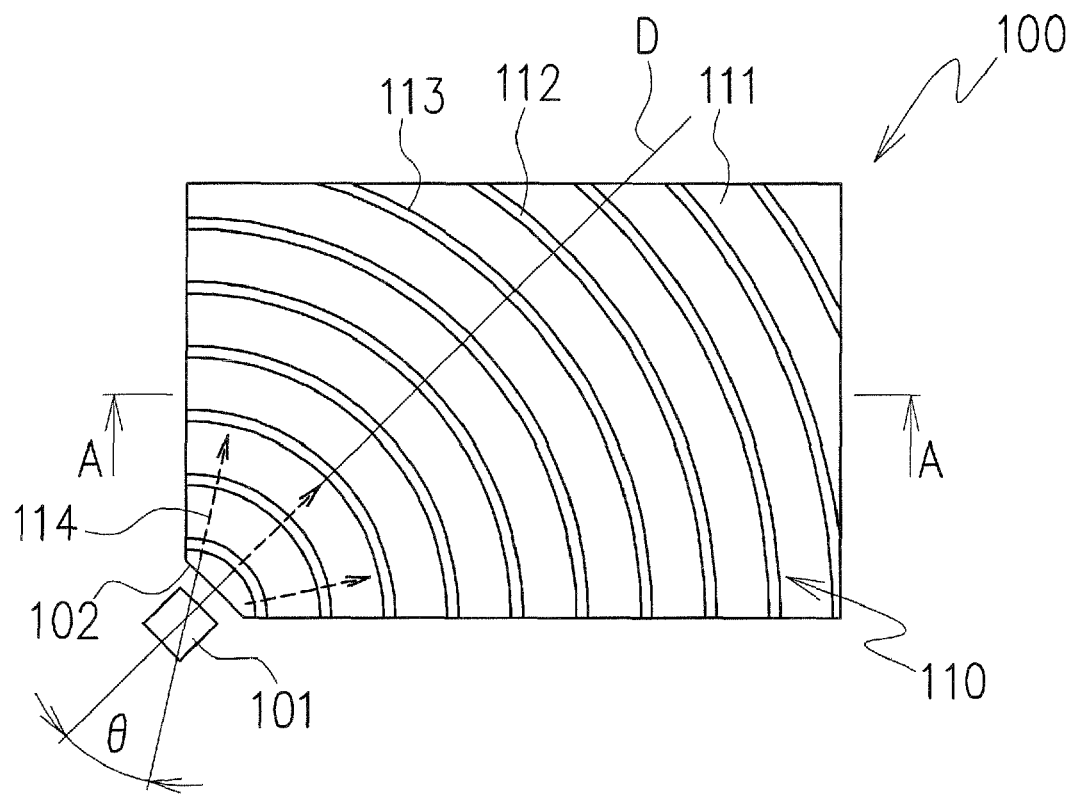
FIG. 1 is a lower surface diagram showing a first embodiment of a light guide plate according to the present invention.

A preferred embodiment of the present invention will be described below in detail with reference to the accompanying drawings. FIG. 1 shows a first embodiment of a light guide plate according to the present invention. A light guide plate 100 has a rectangular shape and is made of, for example, a transparent material. The light guide plate 100 is arranged on the back face side of a display device (not shown) and allows a light flux emitted from a light source 101 to be incident thereon for emitting it to the display device. The light guide plate 100 has an incident plane 102 receiving the light flux from the light source 101. In the first embodiment, the incident plane is a flat plane formed in one corner portion of the light guide plate 100 (see FIG. 1).

The light source 101 includes one LED in this embodiment and is arranged facing the incident plane 102. The illuminating light flux emitted from the light source 101 is incident on the light guide plate 100 in a tilt direction. In this specification, the term "light flux" is a generic name for the light source, that is, light in various directions emitted from the light source 101 to be incident on the light guide plate 100, and the term "light beam" refers to light included in the light flux and traveling in a specified direction.

Figure 2:
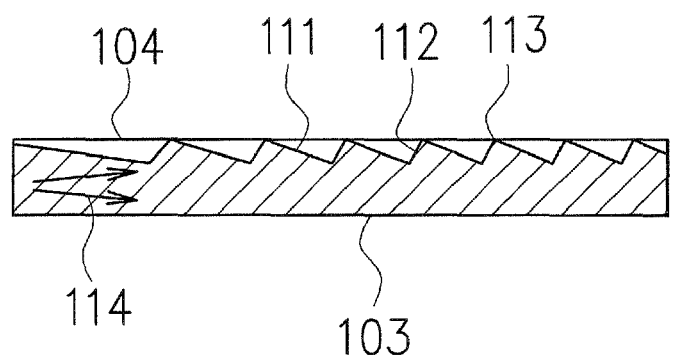
FIG. 2 is a cross-sectional view taken along line A-A of FIG. 1.

The light guide plate 100 has a plurality of prisms 110 reflecting the light flux incident from the incident plane 102. In this embodiment, the prisms 110 are provided on one plane of the light guide plate 100, e.g., a first plane 104 on the side opposite to a second plane 103 which faces the display device. As shown in FIG. 2, each of the plurality of prisms 110 is formed as a triangular columnar prism having a reflection plane 111 tilted gently and downwardly from the front position near the light incident plane 102 toward the rear position far from the incident plane 102 and facing the light source 101, a back plane 112 steeply tilted from the rear position rearward of the light guide plate 100, and a ridge line 113 formed by the reflection plane 111 and the back plane 112. The prisms 110 are formed in a recess shape with respect to the incident plane. It should be noted that the recess shape of the prisms 110 is formed as part of an arc and that the reflection planes 111 of the plurality of prisms 110 are arranged concentrically with respect to the light source 101.

The reflection plane 111 of each of the prism 110 is thus constituted. As shown in FIG. 1, light beams 114 incident at an incident angle θ on a plane in the light guide plate 100 with respect to a center axis D of the light flux illuminated from the light source 101 toward the incident plane 102 of the light guide plate 100 reach the reflection plane 111 of the prism 110 at an angle substantially orthogonal thereto. In other words, most of the light beams emitted from the light source 101 are incident on the incident plane 102 of the light guide plate 100 at a certain angle and reach the reflection plane 111 at an angle substantially orthogonal thereto. A substantial tilt angle α on the reflection plane 111 of the light beam 114 always has a value close to a mold tilt angle α0 on the reflection plane 111 regardless of the measure of the incident angle θ. Uniform light is emitted from the reflection plane 111 to obtain backlight with reduced illumination nonuniformity. The special feature of this embodiment is that the prism 110 is constituted such that the substantial tilt angle α on the reflection plane 111 satisfies α0≧α>α0·cos θ.

Figure 5:
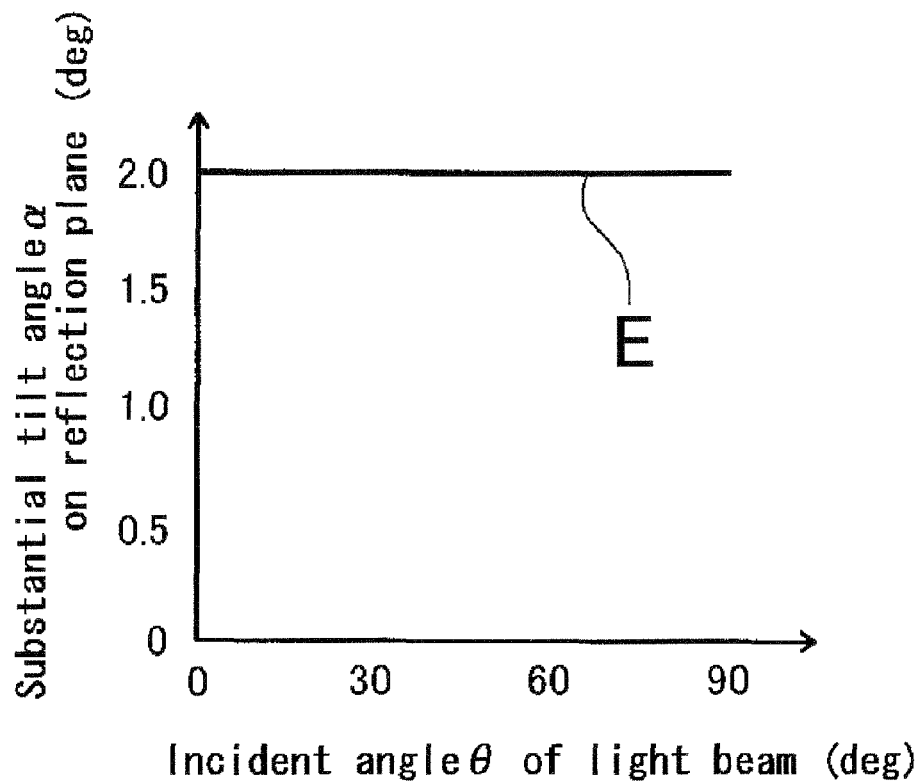
FIG. 5 is a graph showing a substantial tilt angle on a refection plane with respect to an incident angle of a light beam in a prism of the first and second embodiments of the present invention.

FIG. 5 is a graph (curve E) showing the substantial tilt angle α on the refection plane 111 with respect to the incident angle θ of a light beam incident into the incident plane 102 of the prism 110 of the first embodiment. In this embodiment, most of the light beams 114 incident at the arbitrary incident angle θ reach the reflection plane 111 of the prism 110 at an angle substantially orthogonal thereto. The substantial tilt angle α is almost constant regardless of the measure of the incident angle θ and can be represented by shown as the curve E close to a straight line (in this embodiment, α0=approximately 2°, as in the conventional art).

This means that the light guide plate 100 according to the present invention has improved uniformity of illumination brightness as compared with the conventional art light guide plate. Furthermore, it is clearly sufficient merely to arrange one light source 101 opposite the incident plane 102 provided in the corner portion of the light guide plate 100 in order to obtain the thus improved illumination brightness.

In the above embodiment, all the plurality of prisms 110 are formed in an arc shape to be substantially concentrical with respect to the light source 101. It is also permissible that, of the reflection planes 111 of the plurality of prisms 110, only the reflection planes of some prisms arranged in order from the reflection plane 111 closest to the incident plane 102 on which the light flux is incident be formed concentrically with respect to the light source 101. Furthermore, when the prisms 110 are in a recess shape with respect to the incident plane 102, it is not necessary for the reflection planes to be concentrical.

Figure 3:
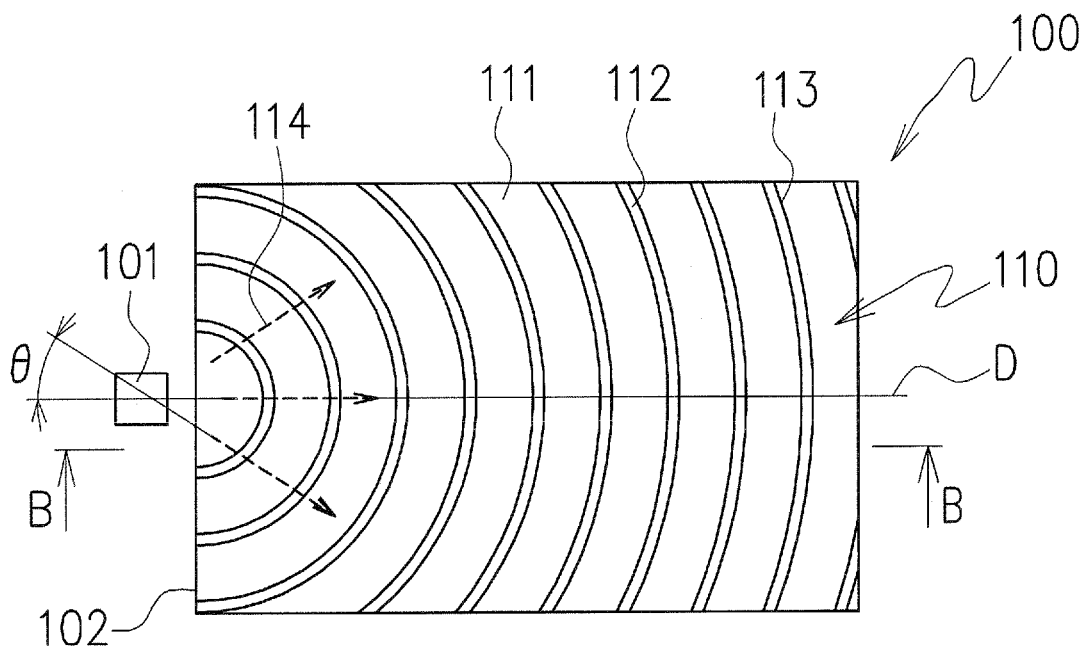
FIG. 3 is a lower surface diagram showing a second embodiment of the light guide plate according to the present invention.
Figure 4:
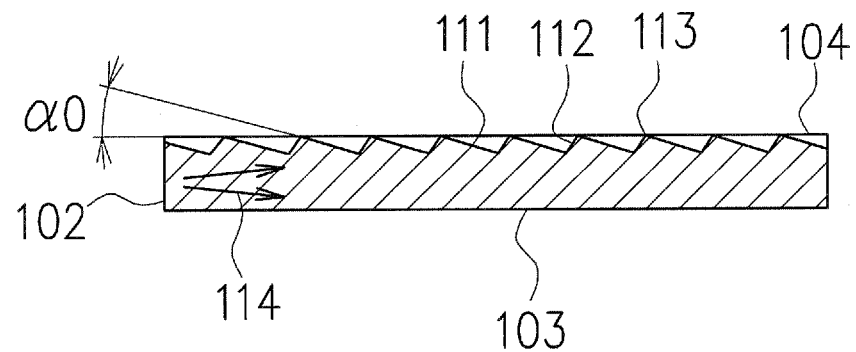
FIG. 4 is a cross-sectional view taken along line B-B of FIG. 3.

FIGS. 3 and 4 show a second embodiment of the light guide plate according to the present invention. In the second embodiment, the light source 101 includes one LED, the incident plane 102 is provided on one side surface of the light guide plate 100, and the light source 101 is arranged substantially in the center of the incident plane 102 of the light guide plate 100. In this embodiment, the plurality of prisms 110 comprising the reflection plane 111, the back plane 112, and the ridge line 113 are provided on the light guide plate 100. The prisms 110 are formed substantially in an arc shape with respect to the light source 101 and are arranged concentrically. Most of the light beams 114 incident at the incident angle θ on a horizontal plane of the light guide plate 100 with respect to the center axis D of the light flux illuminated from the light source 101 toward the incident plane 102 of the light guide plate 100 reach the reflection plane 111 of the prism 110 at an angle substantially orthogonal thereto, as in the previous embodiment. The substantially tilt angle α on the reflection plane 111 of the light beam 114 has a value close to the mold tilt angle α0 on the reflection plane 111 as shown in FIG. 4 regardless of the measure of the incident angle θ. It is possible to draw a graph of the substantially tilt angle α the same as that shown in FIG. 5. In this embodiment, improved uniformity of illumination brightness of the light guide plate 100 can be achieved and one light source 101 is sufficient.

Figure 6:
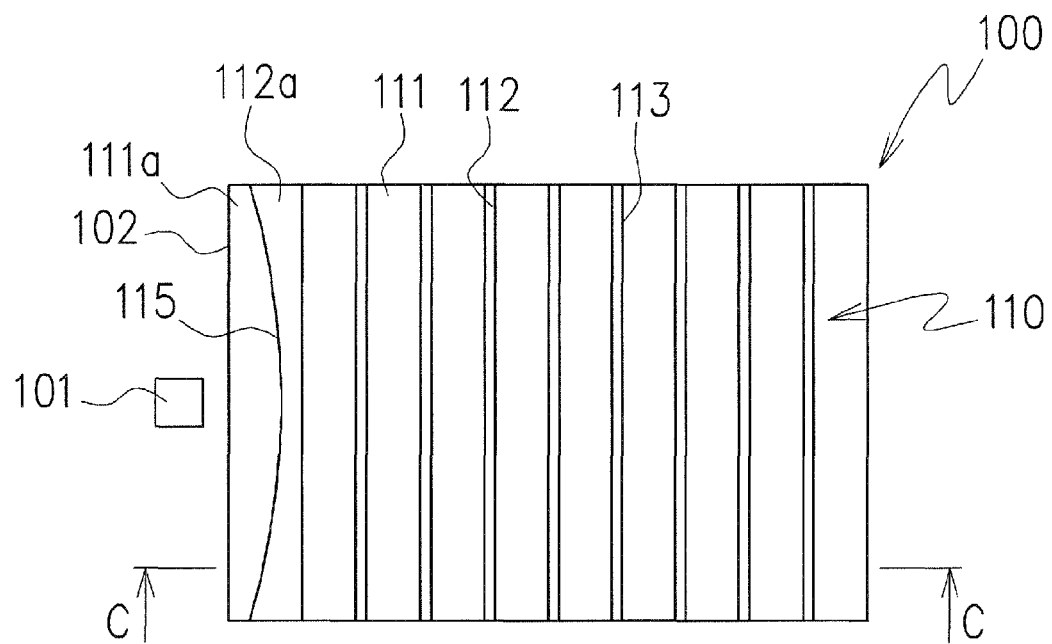
FIG. 6 is a lower surface diagram showing a third embodiment of the light guide plate according to the present invention.
Figure 7:
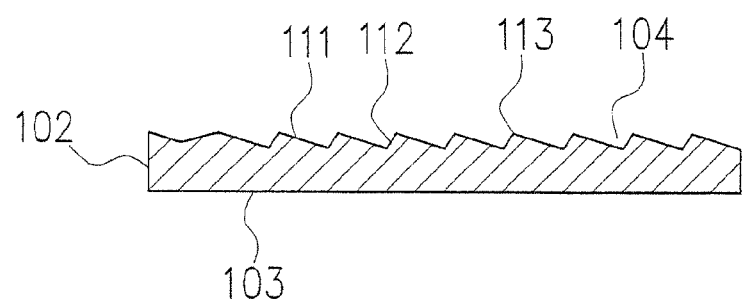
FIG. 7 is a cross-sectional view taken along line C-C of FIG. 6.
Figure 8:
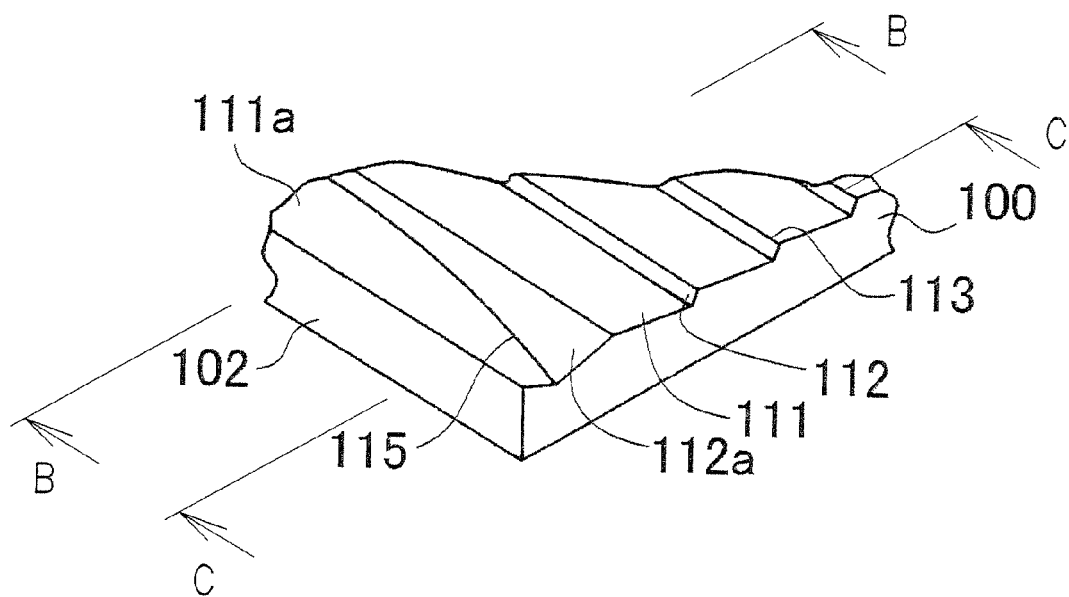
FIG. 8 is a perspective view enlarging a part of the lower surface side of the third embodiment of the light guide plate according to the present invention.
Figure 8A:
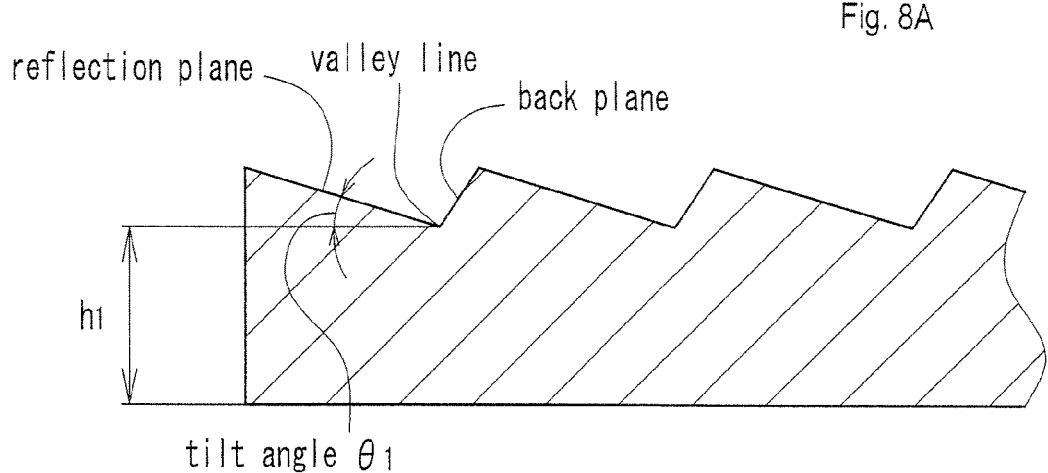
FIG. 8A is a section along line B-B of FIG. 8.
Figure 8B:
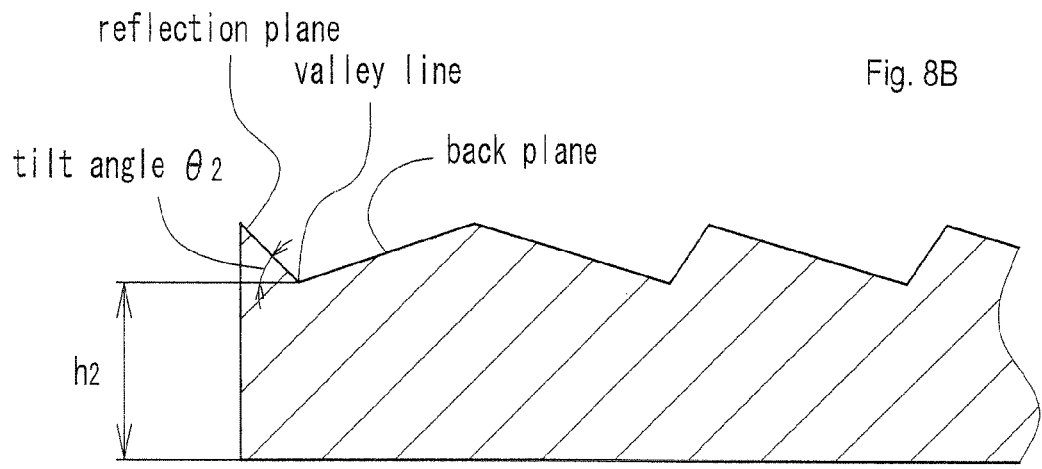
FIG. 8B is a section along line C-C of FIG. 8.
Figure 9:
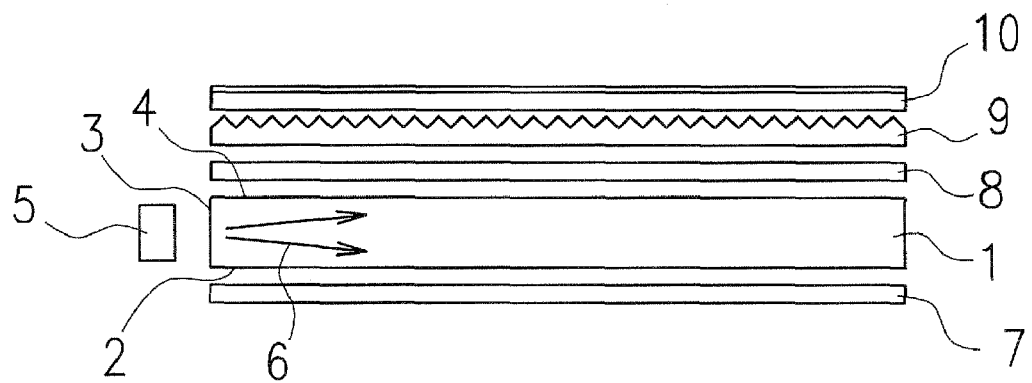
FIG. 9 is a cross-sectional view of an example of conventional art backlight.
Figure 10:
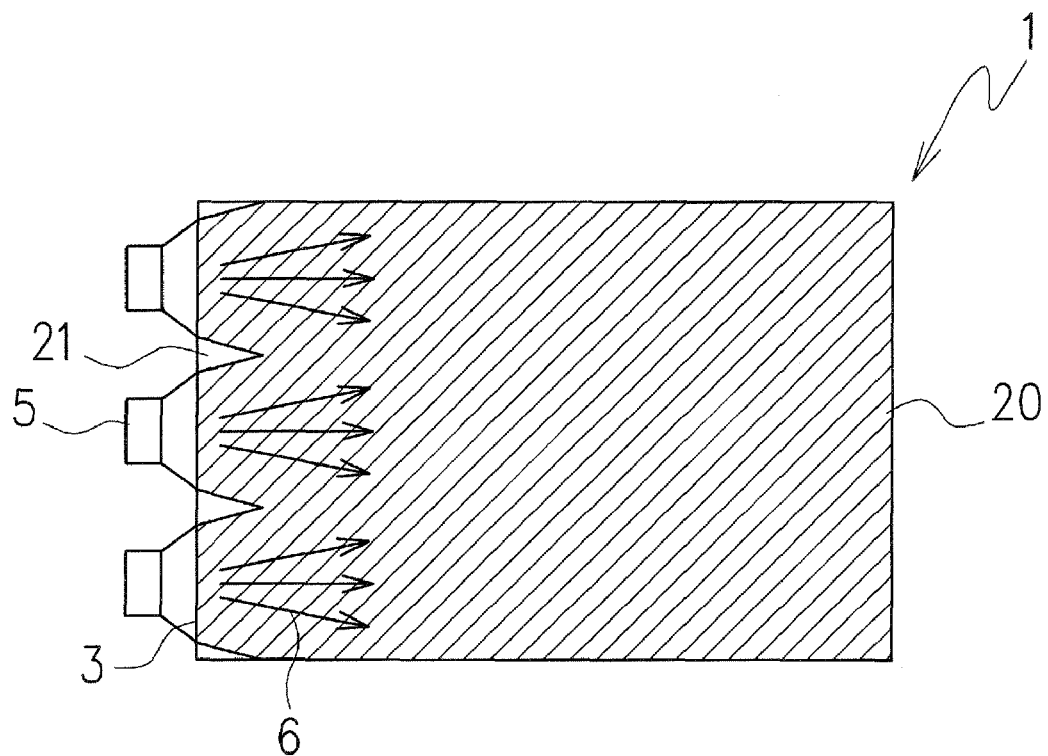
FIG. 10 is a schematic plan view showing illumination nonuniformity of the conventional art backlight.
Figure 11A:
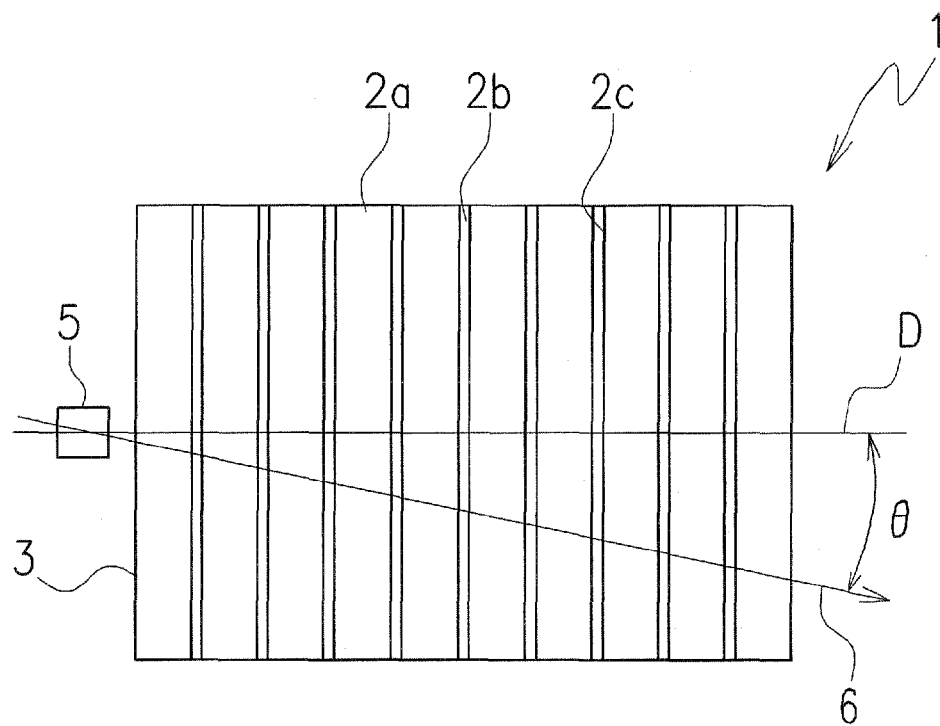
FIG. 11A is a lower surface diagram of a conventional art light guide plate.
Figure 11B:
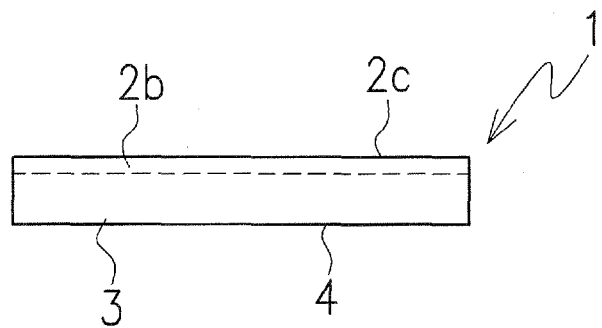
FIG. 11B is a front view of the light guide plate shown in FIG. 11A.
Figure 11C:
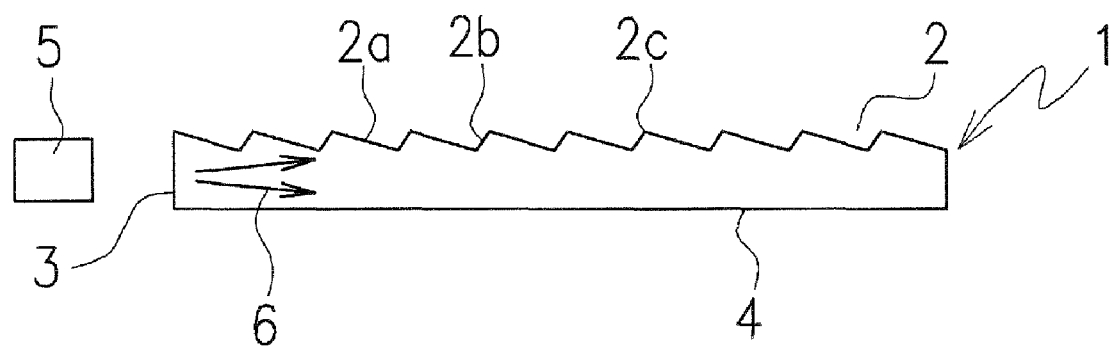
FIG. 11C is a side view of the light guide plate shown in FIG. 11A.
Figure 12:
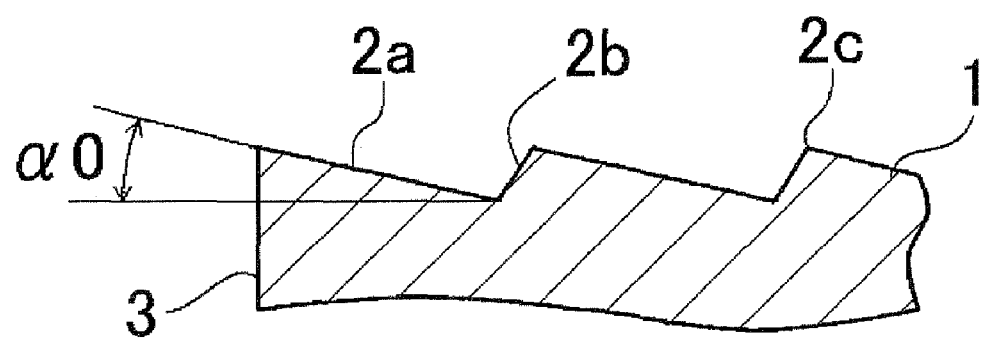
FIG. 12 is a cross-sectional view enlarging part of the light guide plate shown in FIG. 11A.
Figure 13:
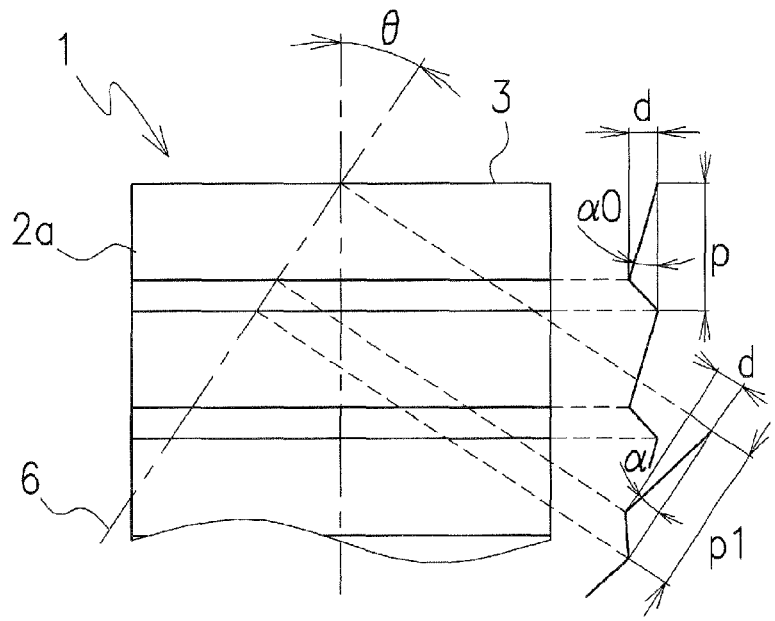
FIG. 13 is an explanatory view showing the difference between a mold tilt angle α0 and a substantial tilt angle α on a reflection plane.
Figure 14:
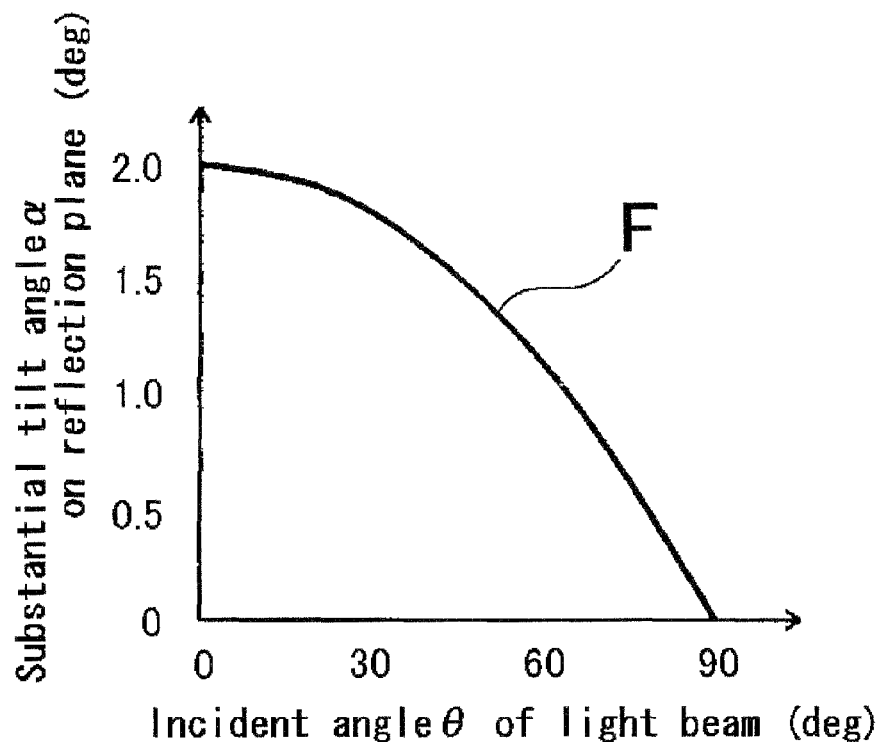
FIG. 14 is a graph showing a substantially tilt angle on a reflection plane with respect to an incident angle of a light beam in a conventional art prism.

FIGS. 6 to 8 show a third embodiment of the light guide plate according to the present invention. Most of the prisms of the light guide plate 100 of the third embodiment have a triangular cross sectional shape and are substantially parallel with the incident plane 102, as in the conventional art. Only a reflection plane 111a of the prism 110 closest to the light source 101 or the incident plane 102 is formed in a recess shape with respect to the incident plane 102 and the recess shape is formed as part of an arc. As shown in FIGS. 6 to 8, the first reflection plane 111a, a back plane 112a, and a valley line 115 connecting the reflection plane 111a and the back plane 112a of the prism closest to the incident plane 102 are in a recess shape. The sections shown in FIGS. 8A and 8B better show the relationship between the reflection plane 111a and the valley line 115, with the valley line 115 being at a constant depth or height (h1) of FIG. 8A and h2 of FIG. 8B, h1 and h2 being the same. The reflection plane 111a changes in tilt angle (as does the back plane 112a). Going from section B-B (FIG. 8A), the reflection plane 111a goes from angle $\theta_1$ to angle $\theta_2$ (with the back plane 112a going in the opposite direction).

In the third embodiment, only the first reflection plane 111a which is closest to the light source 101 and on which an intense light flux is incident has a recess shape. The third embodiment has the effect of increasing the reflectivity of a portion close to the incident plane 102 and having great illumination nonuniformity, although it dose not have as great a direct effect as the first or second embodiments. The substantially tilt angle α of all the prisms formed on the first plane 104 of the light guide plate 100 is different in each position. On average, the substantially tilt angle α can be improved as compared with the conventional art. Although the substantial tilt angle α does not reach the mold tilt angle α0, the following expression is established:

$$\alpha > \alpha 0 \cdot \cos \theta$$

In the third embodiment, only the reflection plane 111a of the prism 110 closest to the incident plane 102 is formed in a recess shape. It is also permissible that the reflection planes 111 of the plurality of prisms 110 relatively close to the light source 101 be formed on the incident plane 102 in a recess shape. And it is of course also permissible that all the prisms formed on the light guide plate 100 be in a recess shape slightly curved with respect to the incident plane 102. In these cases, improved uniformity of illumination brightness of the backlight can be achieved as compared with the conventional art. In this embodiment, the light source 101 includes one LED. However, a plurality of LEDs may also be arranged, although even in such a case, the number of LEDs can be reduced as compared with the conventional art.

The light guide plates shown in the first to third embodiments can be used in combination with a reflection sheet, a diffusion sheet, and a prism sheet, as in the conventional art backlight system.

INDUSTRIAL APPLICABILITY

The light guide plate according to the present invention can improve illumination nonuniformity of backlight without increasing the number of components and can minimize the number of light sources. A display device such as a small electronic device can be uniformly and efficiently illuminated. The quality of the display device can be improved. The cost can be reduced. The light guide plate according to the present invention is very useful in industry.

EXPLANATION OF REFERENCE NUMERALS 100 light guide plate
101 light source
102 incident plane
103 second plane
104 first plane
111 reflection plane
112 back plane
113 ridge line
115 valley line

The invention claimed is:
1. A light guide plate comprising:
opposite surfaces, a peripheral surface between the opposite surfaces;
an incident plane formed at the peripheral surface and configured to receive light emitted from a light source;
a plurality of prisms formed on one of the opposite surfaces, and each of the plurality of prisms having a reflection plane having a tilt angle that reflects the light entering the incident plane, and a back plane adjacent to the reflection plane, the plurality of prisms including at least one prism disposed adjacent to the incident plane; and
wherein the reflection planes of the plurality of prisms are extended in a direction that crosses a traveling direction of the light that is emitted from the light source and traveling in the light guide plate,
wherein the prism that is disposed adjacent the incident plane includes a valley line between the reflection plane and back plane of the prism disposed adjacent the incident plane, the valley line being part of an arc curving away from the incident plane decreasing the tilt angle along the valley line in a direction from the side of the light guide plate towards the center.

2. The light guide plate according to claim 1, wherein the valley line is part of an arc.

3. The light guide plate according to claim 1, wherein the prism is constituted such that the relation between an incident angle $\theta$ formed on a plane of the light guide plate by a center axis of the light flux incident on the light guide plate and a specific light beam included in the light flux and a substantially tilt angle $\alpha$ formed by the light beam and a reflection plane of the prism, when a mold tilt angle of the reflection plane is $\alpha 0$, is $$\alpha > \alpha 0 \cdot \cos \theta.$$

* * * * *